United States Patent
Cavkusic et al.

(10) Patent No.: US 9,462,750 B2
(45) Date of Patent: Oct. 11, 2016

(54) HARVESTING APPARATUS UTILIZING PRESSURIZED FLUID

(71) Applicant: Crary Industries, Inc., West Fargo, ND (US)

(72) Inventors: Damir Cavkusic, Fargo, ND (US); Ben Richard, Fargo, ND (US); Mitchell Lee, Fargo, ND (US); Daniel Ross, Moorhead, MN (US)

(73) Assignee: Crary Industries, Inc., West Fargo, ND (US)

( * ) Notice: Subject to any disclaimer, the term of this patent is extended or adjusted under 35 U.S.C. 154(b) by 0 days.

(21) Appl. No.: 14/686,039

(22) Filed: Apr. 14, 2015

(65) Prior Publication Data

US 2015/0366135 A1    Dec. 24, 2015

Related U.S. Application Data

(60) Provisional application No. 62/013,830, filed on Jun. 18, 2014.

(51) Int. Cl.
  *A01D 43/00*  (2006.01)
  *A01D 57/01*  (2006.01)
  *A01D 61/00*  (2006.01)

(52) U.S. Cl.
  CPC ............. *A01D 57/01* (2013.01); *A01D 61/008* (2013.01)

(58) Field of Classification Search
  CPC .... A01D 57/10; A01D 46/00; A01D 46/005; A01D 57/02; Y10S 56/08
  USPC ..................................... 56/153, DIG. 8, 12.8
  See application file for complete search history.

(56) References Cited

U.S. PATENT DOCUMENTS

| | | | | |
|---|---|---|---|---|
| 859,602 A | * | 7/1907 | Green | A01D 34/30 30/133 |
| 1,794,658 A | * | 3/1931 | Walsh | A01D 57/10 56/1 |
| 2,670,586 A | * | 3/1954 | Phillips | A01D 57/10 56/1 |
| 2,718,744 A | * | 9/1955 | Phillips | A01D 57/10 56/1 |
| 2,734,331 A | * | 2/1956 | Phillips | A01D 57/10 56/1 |
| 2,737,006 A | * | 3/1956 | Klingler | A01D 57/10 37/447 |

(Continued)

*Primary Examiner* — Árpád Fábián-Kovács
(74) *Attorney, Agent, or Firm* — Wood, Phillips, Katz, Clark & Mortimer

(57) ABSTRACT

A harvesting apparatus having a frame and a harvesting assembly on the frame configured to accommodate severed crop as the frame is advanced. A fluid delivery system causes pressurized fluid to be discharged in discrete streams each with a component that is directed to at least one of: a) facilitate severance of crop; and b) cause severed crop to be advanced rearwardly in relationship to the frame to a location for further processing. The fluid delivery system has: i) a primary conduit length extending laterally between the sides of the frame; ii) a plurality of laterally spaced outlets from which fluid from the primary conduit length is discharged; iii) a pressurized fluid source; and iv) a distributing conduit assembly that directs pressurized fluid from the pressurized fluid source to first and second locations from where pressurized fluid is directed in laterally opposite directions into the primary conduit length.

20 Claims, 14 Drawing Sheets

Fig. 3A

(56) References Cited

U.S. PATENT DOCUMENTS

| | | | | |
|---|---|---|---|---|
| 3,073,098 A * | 1/1963 | Farrar | ................... | A01D 45/22 56/128 |
| 3,555,790 A * | 1/1971 | Quick | ................... | A01F 12/10 460/16 |
| 3,704,576 A * | 12/1972 | Quick | ................... | A01D 46/28 56/330 |
| 3,760,573 A * | 9/1973 | Porter | ................... | A01D 45/007 56/12.9 |
| 3,828,531 A * | 8/1974 | Quick | ................... | A01D 57/10 415/148 |
| 3,964,245 A * | 6/1976 | Hecht | ................... | A01D 46/00 56/12.9 |
| 4,083,773 A * | 4/1978 | Clary | ................... | A01D 46/285 209/134 |
| 4,168,798 A * | 9/1979 | Moore | ................... | A01M 7/0064 239/121 |
| 4,186,547 A * | 2/1980 | James | ................... | A01D 46/285 56/13.3 |
| 4,194,346 A * | 3/1980 | Ingalls | ................... | A01D 51/002 56/12.8 |
| 4,303,373 A * | 12/1981 | Polhemus | ................... | A01D 45/30 415/206 |
| 4,406,112 A * | 9/1983 | Brooks | ................... | A01D 57/10 56/12.9 |
| 4,730,444 A * | 3/1988 | Leffel | ................... | A01D 45/30 56/12.9 |
| 4,825,628 A * | 5/1989 | Brooks | ................... | A01D 57/08 56/14.5 |
| 4,866,919 A * | 9/1989 | Brooks | ................... | A01D 57/10 56/12.9 |
| 4,936,082 A | 6/1990 | Majkrzak | | |
| 5,074,107 A * | 12/1991 | Windemuller | ................... | A01D 46/28 56/12.8 |
| 5,134,837 A * | 8/1992 | Casey | ................... | A01D 45/30 56/12.8 |
| 6,085,510 A * | 7/2000 | McDonnell | ................... | A01D 57/10 56/12.9 |
| 6,227,770 B1 * | 5/2001 | Poncelet | ................... | A01C 7/082 406/195 |
| 6,290,433 B2 * | 9/2001 | Poncelet | ................... | A01C 7/082 406/181 |
| 7,063,276 B2 * | 6/2006 | Newton | ................... | F16L 41/03 239/146 |
| 7,337,992 B1 * | 3/2008 | Blatt | ................... | A01C 15/04 222/637 |
| 7,591,127 B1 * | 9/2009 | Stacer | ................... | A01D 65/00 56/12.9 |
| 7,870,713 B2 * | 1/2011 | Schroeder | ................... | A01D 57/10 56/12.8 |
| 2012/0301231 A1 * | 11/2012 | Jagow | ................... | A01C 7/082 406/183 |
| 2015/0223399 A1 * | 8/2015 | Kokanovic | ................... | A01D 46/005 56/328.1 |

* cited by examiner

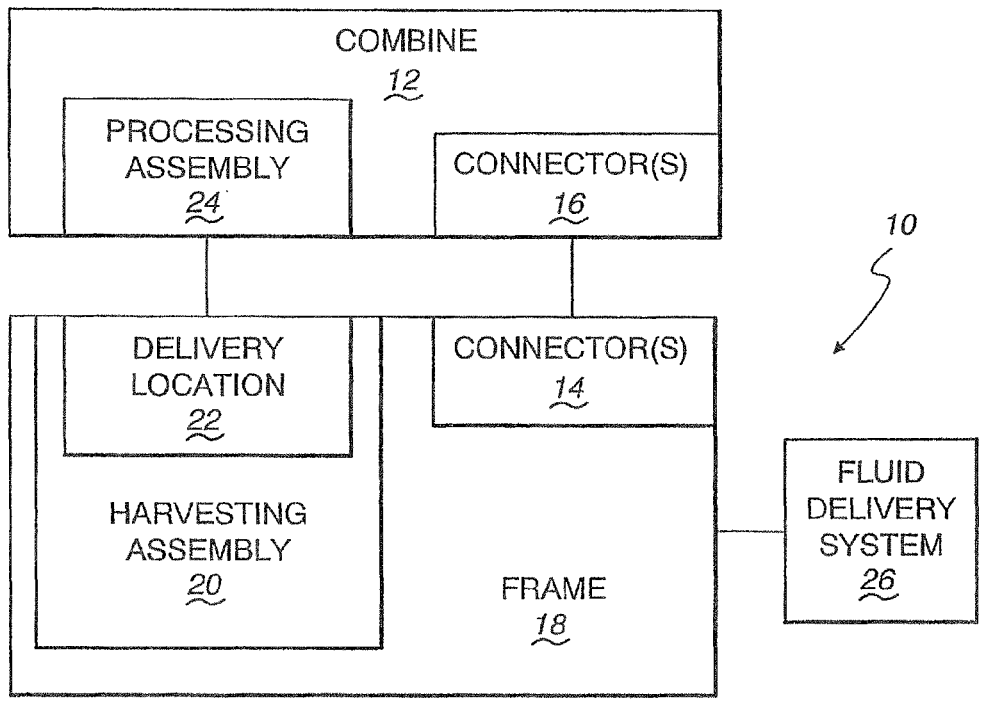
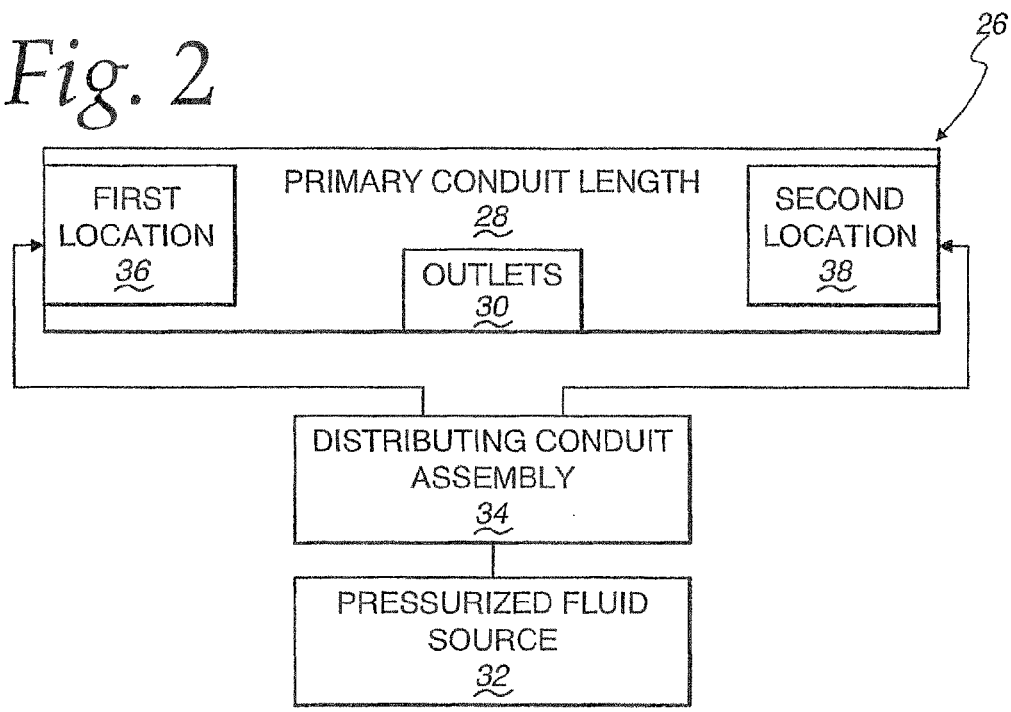

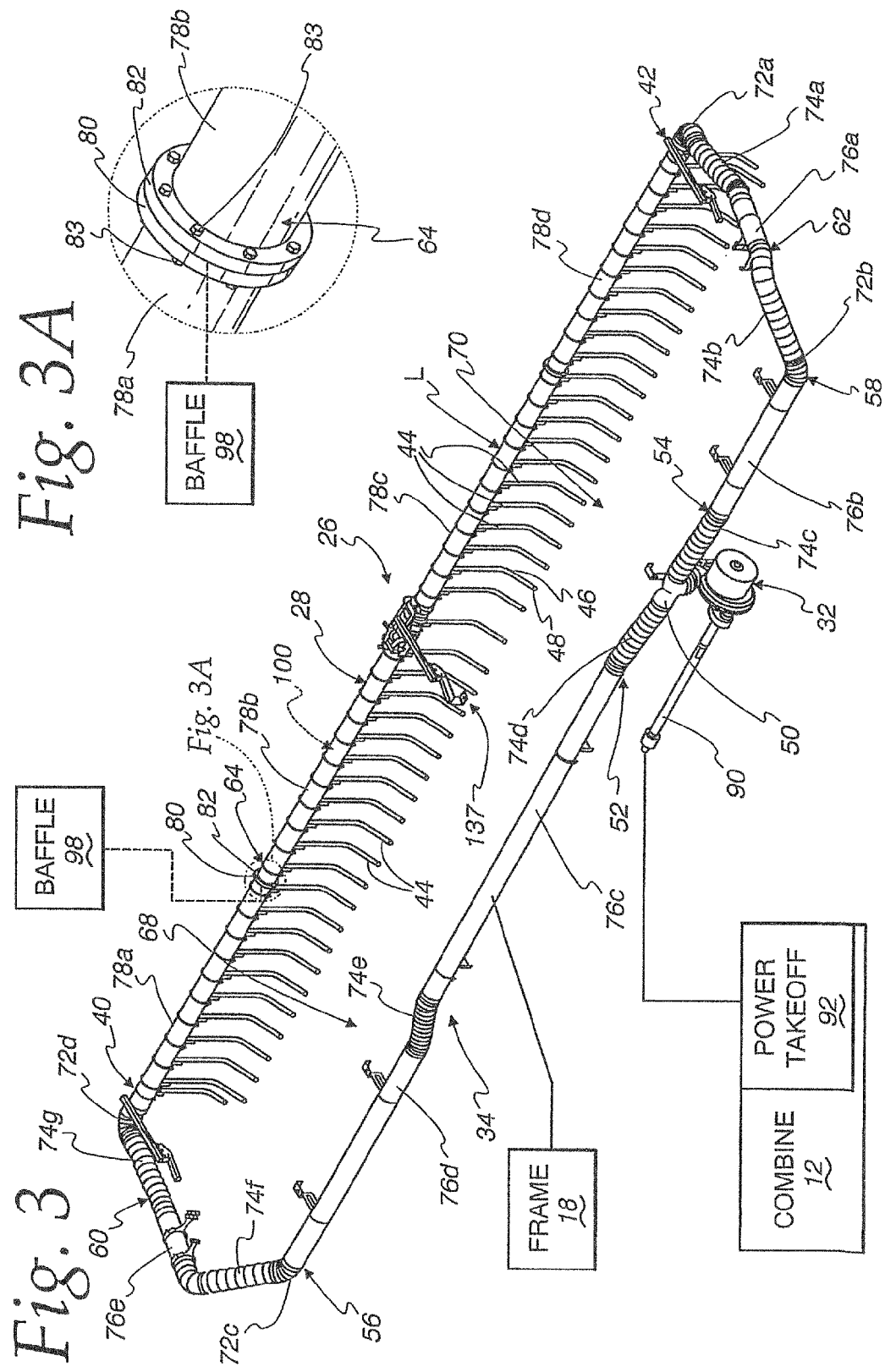

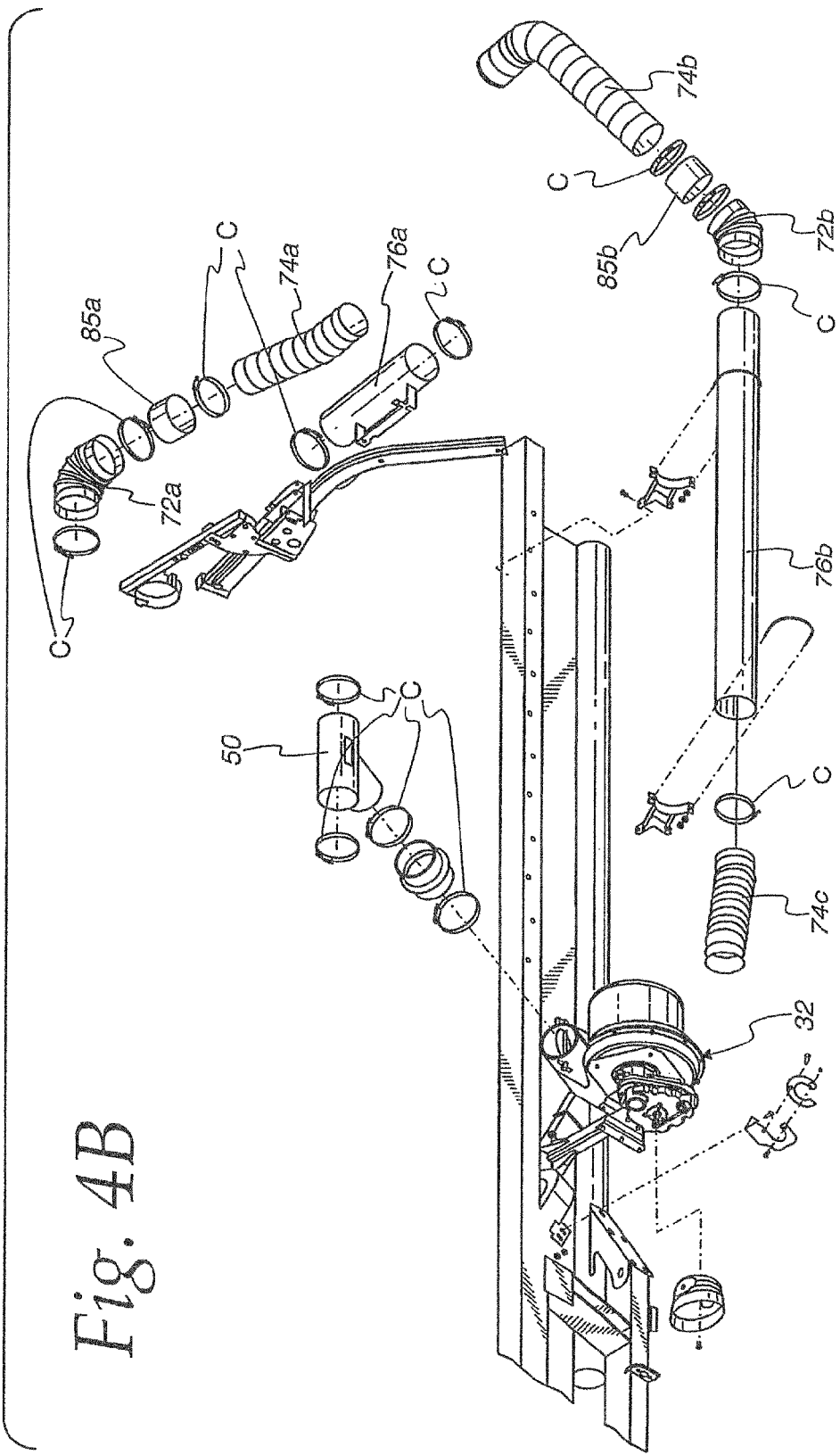

HARVESTING APPARATUS UTILIZING PRESSURIZED FLUID

BACKGROUND OF THE INVENTION

1. Field of the Invention

This invention relates to a harvesting apparatus and, more particularly, to a harvesting apparatus that utilizes pressurized fluid to assist the movement of crop that is cut by the apparatus and/or in a pre-cut state in a field preparatory to processing by the apparatus.

2. Background Art

A basic harvesting system utilizes a combine that separates usable crop from stalks, vines, etc. A wide range of different crops are accumulated and delivered to the combine through a harvesting head. The harvesting heads take different forms based upon the particular crop that is being harvested. Even for the same crop, myriad different designs exist with different operational capabilities.

The heads have different constructions depending upon whether they are designed to sever the crop or handle pre-cut crop. In the former case, cutting may be effected by stationary cutting edges or by edges formed on components that move, as by reciprocation, as the combine is advanced.

In the 1980s, the assignee herein was a pioneer in the design of harvesters utilizing pressurized fluid to assist basic harvester head operation. The state of the art at that time, and one of assignee's early products, are described in U.S. Pat. No. 4,936,082, incorporated herein by reference.

Briefly, pressurized air is directed through stationary drop tubes that work in conjunction with rotary reels to situate crop optimally for severance and advance the severed crop at a continuous and steady flow volume to the combine for further processing thereby. The drop tubes have strategically configured and oriented nozzles to effect this operation.

Alternatively, pressurized fluid is directed through nozzles incorporated into the rotary reel to move therewith to perform the same basic functions.

Harvesting heads may be made with a very substantial width, commonly as high as 45 feet. Designs with widths exceeding 45 feet also exist. Efficient use of the pressurized fluid requires the generation of air streams that collectively produce a curtain that uniformly controls the crop movement across the entire width of the head. To achieve this end, the pressure of the fluid is ideally substantially constant across the entire head width.

Different systems have been devised and are currently in practice with the above design objectives. In one form, two separate fluid pressurizing units are incorporated, each associated with like conduit arrangements that cause the pressurized fluid to advance laterally from opposite sides of the head towards the center, for distribution by the drop tubes or through the rotating reel.

While these systems have been successful commercially, they have a primary drawback that two separate units for generating pressurized fluid must be purchased, incorporated into the heads, and independently operated. The separate units may necessitate a substantial up-front investment. Separate drives are required on the combine for each of the units. This may dictate that a substantial modification be made to a combine to accommodate the separate fluid pressurizing units. Optimal performance requires that the units must be synchronized—a state that may be difficult to establish and maintain. At the same time, two separate units must be incorporated without interfering with other structure or creating an obstruction that must be worked around by the combine operator. Still further, separate units generally require a large power draw which might compromise a combine's ability to operate efficiently and even simultaneously perform other functions for which it is designed. The combine operator is also required to maintain the separate units on a regular basis.

It is known to use a single source of pressurized fluid to deliver a fluid by movement thereof in a single direction through the entire length of a manifold with associated drop tubes along the widthwise extent thereof. Regardless of the capacity of this type of pressurized fluid source, there inevitably results a significant variation in pressure of fluid discharging from the drop tube nozzles along the head width. This can lead to uneven crop delivery and/or localized accumulation that may interfere with efficient combine operation and in the end result in loss of valuable, usable crop. Typically, baffles are incorporated into the manifold and/or the cross-sectional area thereof may be strategically reduced to maintain pressure. However, typically there will still be a localized pressure reduction around the baffle that may compromise overall system performance.

Another problem that has plagued the industry is the unwanted accumulation of crop at the rear of the frame at a feed housing on the frame through which accumulated crop is directed for delivery to a combine for processing thereby. This accumulation may progressively increase to the point that it interferes with a desired steady volume of flow of crop from the head to the combine. Manual clearing of this accumulation of crop may be required. This results in an interruption of the harvesting operation and also is burdensome to the combine operator. This crop accumulation could also interfere with the operator's visual monitoring of the head as the combine is advanced.

In spite of the above problems, the industry has continued to use the above-described systems since alternative designs that would alleviate the above problems have not heretofore been devised.

SUMMARY OF THE INVENTION

In one form, the invention is directed to a harvesting apparatus that includes: a frame configured to be advanced over an area in which a crop is grown, the frame having laterally spaced sides, a front, and a rear; a harvesting assembly on the frame configured to process severed crop over a width between the spaced sides of the frame as the frame is advanced; and a fluid delivery system through which pressurized fluid is discharged in discrete streams each with a component that is directed to at least one of: a) facilitate severance of crop; and b) facilitate advancement of severed crop rearwardly in relationship to the frame to a location for further processing. The fluid delivery system has: i) a primary conduit length extending in a lateral direction between the sides of the frame; ii) a plurality of laterally spaced outlets from which fluid from the primary conduit length is discharged; iii) a pressurized fluid source; and iv) a distributing conduit assembly that directs pressurized fluid from the pressurized fluid source to first and second locations from where pressurized fluid is directed in laterally opposite directions into the primary conduit length.

In one form, the fluid delivery system is configured so that the pressurized fluid directed in laterally opposite directions into the primary conduit length is caused to blend at a first location.

In one form, the first location is closer to one of the spaced frame sides than the other spaced frame side.

In one form, the pressurized fluid supply is configured to delivery pressurized fluid into the distributing conduit assembly at a second location that is closer to the other of the spaced sides than the one of the spaced sides.

In one form, the primary conduit length and distributing conduit assembly define a continuous loop into which pressurized fluid from the pressurized fluid source is delivered to flow in opposite directions.

In one form, the continuous loop is defined by a laterally extending rear conduit portion and first and second laterally spaced legs each extending in a fore-and-aft direction between the primary conduit length and the rear conduit portion.

In one form, the fluid delivery system is configured to direct pressurized air through the laterally spaced outlets that are one of: a) movable with a rotary reel; and b) on a conduit length fixed to the frame.

In one form, the distributing conduit assembly has a conduit with an inside diameter on the order of eight inches.

In one form, the pressurized fluid source is attached to the frame to move as one piece with the frame.

In one form, the pressurized fluid source includes a rotary fan assembly and a gearbox with an input shaft that is driven to operate the rotary fan assembly.

In one form, the distributing conduit assembly has first and second conduit portions that are connected to the pressurized fluid source so that pressurized fluid generated by the pressurized fluid supply source is directed in opposite directions through the first and second conduit portions away from the fluid supply source.

In one form, the continuous loop is defined by first and second oppositely opening U-shaped sections.

In one form, the fluid delivery system has a plurality of fixed drop tubes that are each connected to the primary conduit length to direct pressurized fluid in the primary conduit length in a stream that has a rear directional component.

In one form, the fluid delivery system has one of a "Y"- and "T"-shaped connector that directs pressurized fluid from the pressurized fluid supply source into each of the first and second conduit portions.

In one form, the distributing conduit assembly has a plurality of: a) reconfigurable conduit lengths; and b) substantially rigid conduit lengths that are joined together.

In one form, the harvesting assembly is configured to at least one of: a) sever crop; and b) process pre-severed crop.

In one form, the harvesting assembly is configured to advance severed crop laterally to a delivery location approximately mid-way between the laterally spaced sides of the frame.

In one form, the harvesting assembly has a reel that rotates around a laterally extending axis relative to the frame and is configured to advance crop rearwardly relative to the frame and the primary conduit length extends laterally through the reel.

In one form, the invention is directed to a fluid delivery system as described above.

In one form, the fluid delivery system is configured so that the pressurized fluid directed in laterally opposite directions into the primary conduit length is caused to blend at a first location.

BRIEF DESCRIPTION OF THE DRAWINGS

FIG. 1 is a schematic representation of a harvesting apparatus, according to the present invention, in relationship to a combine;

FIG. 2 is a more detailed, schematic representation of a fluid delivery system on the harvesting apparatus in FIG. 1;

FIG. 3 is a partially schematic, perspective view of one specific form of harvesting apparatus, as shown in FIGS. 1 and 2;

FIG. 3A is an enlarged view of the structure within the circle identified as FIG. 3A in FIG. 3;

FIGS. 4A and 4B together are an enlarged, exploded view of the harvesting apparatus as shown in FIG. 3;

DETAILED DESCRIPTION OF THE PREFERRED EMBODIMENT

Figure 4A:
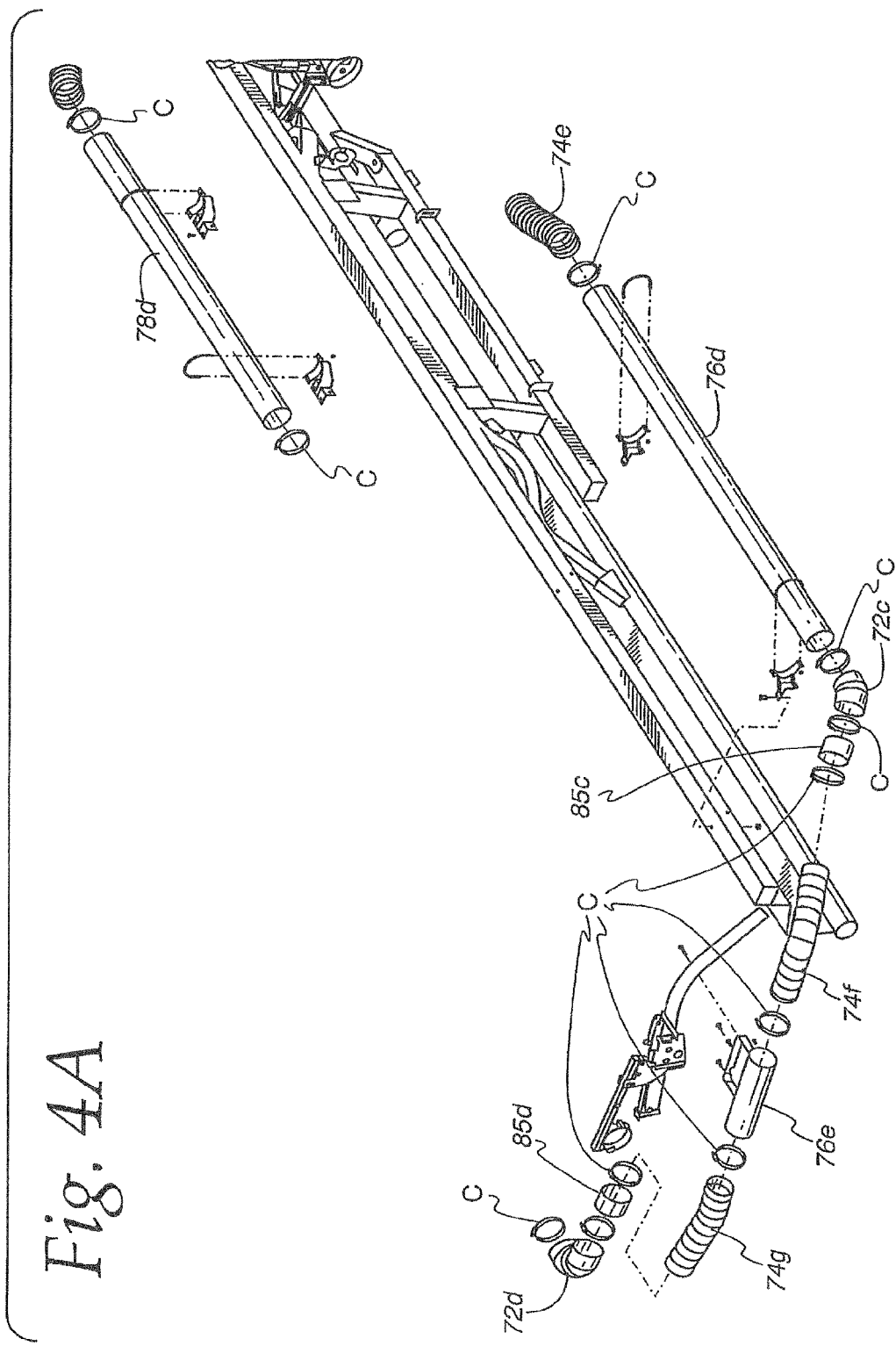

In FIG. 1, a harvesting apparatus, according to the present invention, is shown schematically at 10. The harvesting apparatus 10, commonly referred to as a "head", is designed for use in conjunction with a combine 12 through which the harvesting apparatus 10 is advanced over a field in which crop has been grown. Typically, the harvesting apparatus 10 and combine 12 will be releasably joined through cooperating connectors 14, 16, respectively on the harvesting apparatus 10 and combine 12.

The harvesting apparatus 10 consists of a frame 18 that is advanced by the combine 12 and supports the operating components for the harvesting apparatus 10. The frame 18 has laterally spaced sides, a front, and a rear.

The harvesting apparatus 10 may have a different configuration depending upon the particular crop being harvested. As just examples, the crop may be soybeans, a cereal crop, corn, etc.

A harvesting assembly 20 on the frame 18 is configured to process crop over a width between spaced sides of the frame 18 as it is advanced. The harvesting assembly 20 may be configured to: a) sever crop; and/or b) process pre-severed crop, as by controlled delivery to the combine 12. The schematic showing of the harvesting assembly 20 is intended to encompass virtually any type of existing harvesting assembly that causes a continuous supply of crop to be delivered to the combine 12 as the frame 18 is advanced by the combine 12. The harvesting assembly 20 may include a reel that rotates around a laterally extending axis relative to a frame 18 to direct crop rearwardly relative to the frame 18.

The harvesting assembly 20 might include an auger that causes crop intercepted and contained on the frame 18 to be routed from laterally opposite sides in paths converging at a delivery location 22. Alternatively, it may use a drape or a design with a fabric or rubber apron that performs the function of the cross auger.

Whether the harvesting assembly 20 is designed to sever crop or handle only pre-severed crop, generally it will be configured to accommodate/process the severed crop over the width thereof and cause the intercepted crop to be directed to the delivery location 22 from where the crop is directed to a processing assembly 24 on a combine 12 through which usable crop is separated and accumulated either on the combine 12, or at a separate point of use, such as in a separate storage device. Typically, the delivery location 22 will be approximately midway between the laterally spaced sides of the frame 18.

The schematic showing of the harvesting apparatus 10 is intended to encompass virtually all conceivable types of harvesting assembly that either: a) sever and controllably advance severed crop; or b) handle/process pre-severed crop, regardless of the nature of the crop. While specific examples of harvesting assemblies will be described hereinbelow, these are exemplary in nature only, as the precise construction of the harvesting assembly 20 is not critical to the present invention, so long as it may realize any benefit from using pressurized fluid to control processing and movement of the crop. This will typically be to either: a) facilitate severance of crop by the harvesting assembly 20; or b) cause crop, pre-severed or severed by the harvesting assembly 20, to be advanced rearwardly in relationship to the frame 18 for further processing. The performed processing includes controlled advancement of crop to the delivery location 22 and potentially other processing that might be accomplished on the frame 18 or by structure associated therewith, or by the combine 12.

According to the invention, a fluid delivery system 26 is utilized as either an integral part of the frame 18 or as a separate assembly. The fluid delivery system 26, as shown in more detail in FIG. 2, but still in schematic form, consists basically of a primary conduit length 28, that functions as a manifold used to supply a plurality of laterally spaced outlets 30 from which pressurized fluid in the primary conduit length 28 is controllably discharged.

Pressurized fluid, typically air, is generated by a source 32 which supplies a distributing conduit assembly 34 that directs pressurized fluid to first and second laterally spaced first and second locations 36, 38, respectively, from where pressurized fluid is directed in laterally opposite directions into the primary conduit length 28. From the primary conduit length 28 the pressurized fluid is discharged controllably at the outlets 30 across the width of the primary conduit length 28.

Preferably, the fluid delivery system 26 is configured such that the pressurized fluid directed in laterally opposite directions into the primary conduit length 28 is caused to blend at a location between the first and second locations 36, 38.

Again, the schematic showing of the components in FIG. 2 is intended to encompass a wide range of different component configurations that could be devised by one skilled in the art without departing from the invention. The schematic showing is intended to encompass all such different component configurations and their interactions, with the specific forms hereinbelow being only exemplary in nature.

In FIGS. 3, 3A, 4A, and 4B, an exemplary form of the fluid delivery system 26 is shown on the frame 18. The fluid delivery system 26 may be united with the frame 18 at initial manufacture or retrofit thereto to move as one piece therewith as the combine 12 advances the frame 18.

The primary conduit length 28 is substantially straight between laterally spaced ends 40, 42.

A plurality of down tubes 44 are spaced equidistantly between the ends 40, 42. Each down tube 44 is connected to depend from the primary conduit length 28 and has a rearwardly bent lower portion 46 that terminates at a nozzle 48 forming the outlets 30 through which the pressurized fluid is directed in a stream that has a rearward directional component.

The pressurized fluid source 32 is integrated to reside closer to the side 42 than the side 40. Through a "T" or "Y" connector 50, pressurized fluid generated is directed in laterally opposite directions into long and short conduit portions/lengths 52, 54, respectively. The conduit portions/lengths 52, 54 together make up a rear conduit portion and have a combined length approximately equal to that of the primary conduit length 28 at the front of the fluid delivery system 26.

The long conduit portion/length 52 terminates remotely from the pressurized fluid source 32 at an end 56, with the short conduit portion/length terminating at an opposite end 58.

A first conduit leg 60 extends generally in a fore-and-aft direction to connect between the ends 40, 56 of the primary conduit length 28 and the long conduit portion/length 52, with a corresponding second leg 62 connecting between the ends 42, 58 on the primary conduit length 28 and the short conduit portion/length 54.

The conduit portions/lengths 52, 54 and conduit legs 60, 62 cooperatively define the aforementioned distributing conduit assembly 34 which, together with the primary conduit length 28, define a continuous loop L into which pressurized fluid from the source 32 is caused to flow in opposite directions. The oppositely directing flow blends at a location generally as indicated at 64, that is preferably closer to the end 40 of the primary conduit length than the end 42 thereof.

As viewed in plan, the defined loop L has an overall rectangular shape defined by oppositely opening U-shaped sections 68, 70.

In the depicted embodiment, the entire loop L is defined by pieces, that may be in the form of lengths of conduit or connectors, each with an inside diameter on the order of eight (8) inches. Of course, this is not a requirement, as each system requirement may dictate construction adequate to meet pressurized fluid volume and velocity demands. The loop L may be constructed from myriad different combinations of components. As depicted, rubber elbows 72a, 72b, 72c, 72d are used to connect the legs 60, 62 to each of the primary conduit length 28 and the rear conduit portion defined by the conduit portions/lengths 52, 54.

Conduit pieces, with a corrugated construction to define reconfigurable conduit lengths, are shown at 74a-74g, and are selectively shaped to facilitate deviation from a straight run to accommodate existing components on the frame 18 and to optimally position the primary conduit length 28 without obstruction of flow through the loop L. Non-flexible/fixed lengths of conduit 76a-76e are integrated into the loop L through the elbows 72a-72e and reconfigurable conduit lengths 74a-74g. The lengths of the components 72a-72e, 74a-74g, and 76a-76e are selected to allow the loop L to be strategically formed around the frame 18 compactly and without interfering with other operating components, inhibiting fluid flow, or significantly obstructing an operator's vision. The arrangement of components and their lengths may be varied depending upon the particular frame configuration.

The ability to mix and match the above types of components, aside from allowing customization, also permits component parts to be controlled in length, as to facilitate handling and meet dimensional shipping limitations. For example, whereas a straight run between the ends 56, 58 could be made from a single length of non-flexible conduit, with designs wherein this length is required to be incorporated into a frame having a width of 35, 40, or 45 feet, this would be impractical.

The primary conduit length 28 can also be made from joinable parts 78a-78d. These parts 78a-78d may be telescopingly joined for controlled length selection or made with mateable flanges 80, 82, as shown at the abutted ends of the parts 78a, 78b, which may be bolted together using conventional fasteners 83.

Figure 5:
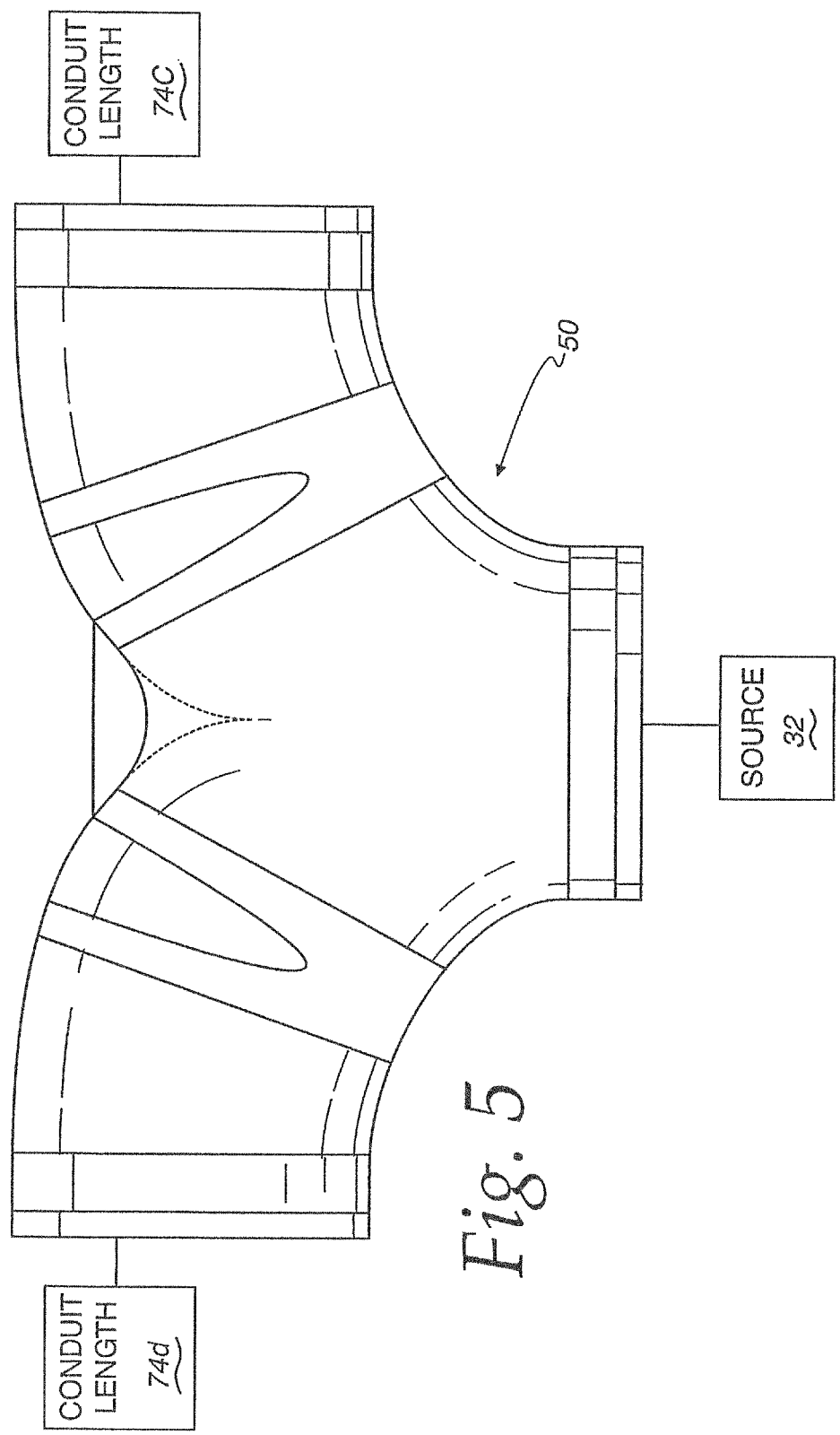
FIG. 5 is an enlarged, elevation view of a connector for distributing pressurized fluid developed by a source.

The pressurized fluid source 32 is integrated into the loop L most preferably through the connector 50 having a "Y" shape, as shown additionally in FIG. 5. The "Y" shape is preferred as it has proven to account for a limited pressure loss where the pressurized flow from the source 32 is divided.

All component connections can be made as by using securable telescoping end arrangements. Short connecting sleeves 85a, 85b, 85c, 85d are used at each elbow location. The telescoping connections throughout can be secured by conventional, restrictable clamps C. Connection locations may be made using non-metal material or a metal such as aluminum or steel. The reconfigurable conduit lengths 74, 76 and conduit parts 78 may be made from aluminum, or other metal. In one preferred form, the material making up the connector 50, and elbows 72a, 72b, 72c, 72d, is molded EPDM.

Figure 6:
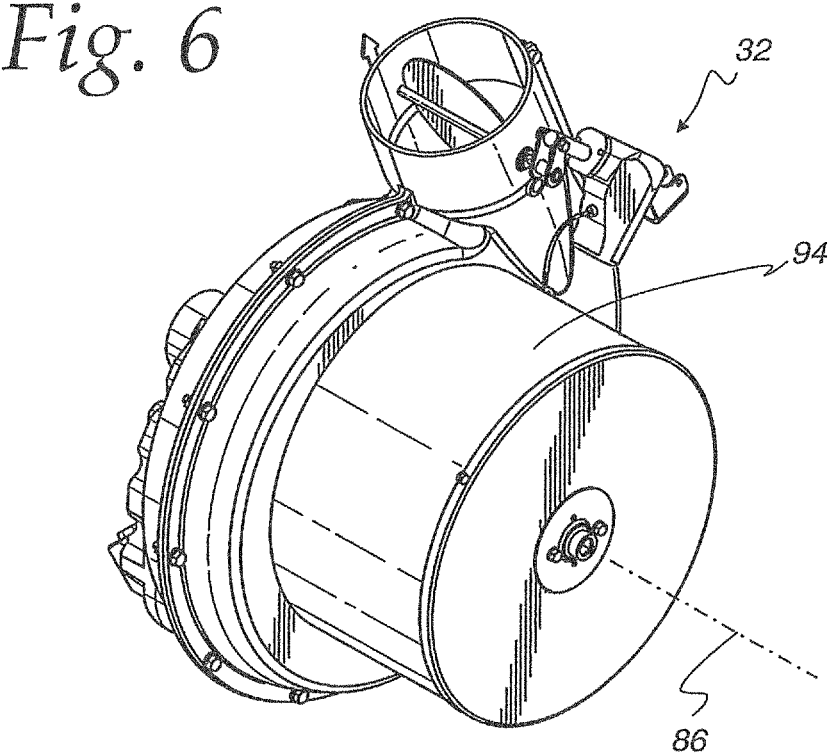
FIG. 6 is an enlarged, perspective view of the pressurized fluid source, as shown in FIG. 3.
Figure 7:
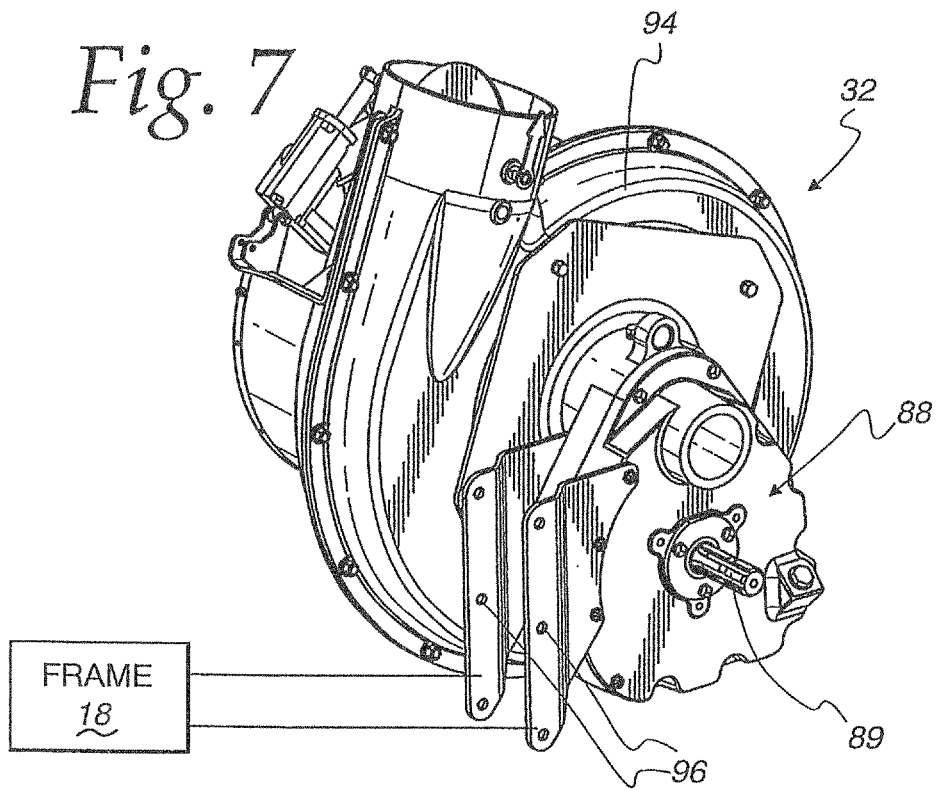
FIG. 7 is a view as in FIG. 6 from a different perspective.

The pressurized fluid source 32, as shown in further detail additionally in FIGS. 6 and 7, preferably uses a centrifugal fan component (not shown) rotated around an axis 86 by a gear box 88 with an input shaft 89 operated by a drive line 90. The drive line 90 driven by a power takeoff 92 (FIG. 3) on the combine 12. The pressurized fluid source 32 has a housing 94 with brackets 96 usable to secure the source 32 to the frame 18.

Figure 8:
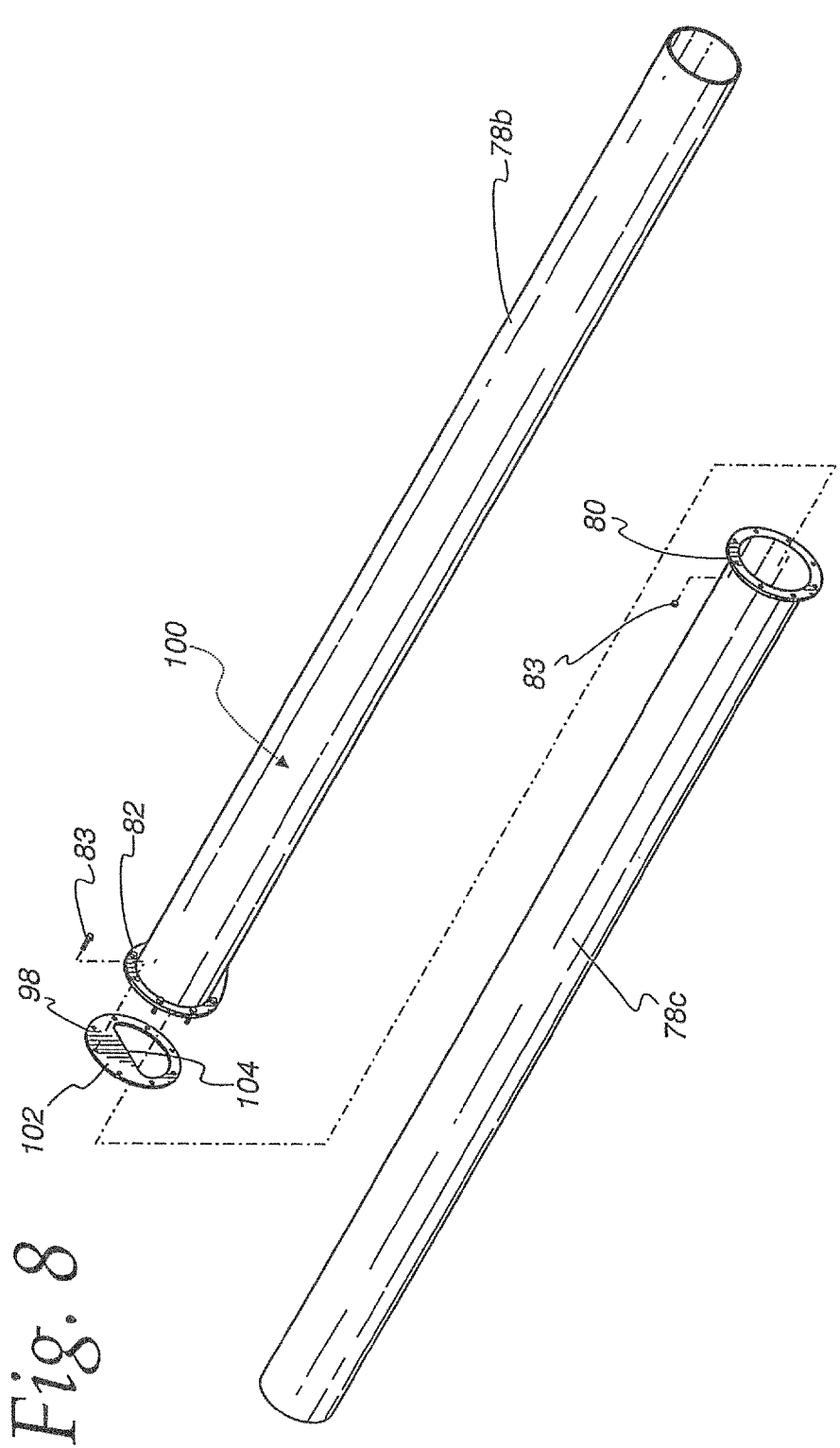
FIG. 8 is an enlarged, exploded, perspective view of a baffle, as shown schematically in FIGS. 3 and 3A, in relationship to joined parts making up a portion of a primary conduit length that delivers pressurized fluid to separate outlets.
Figure 9:
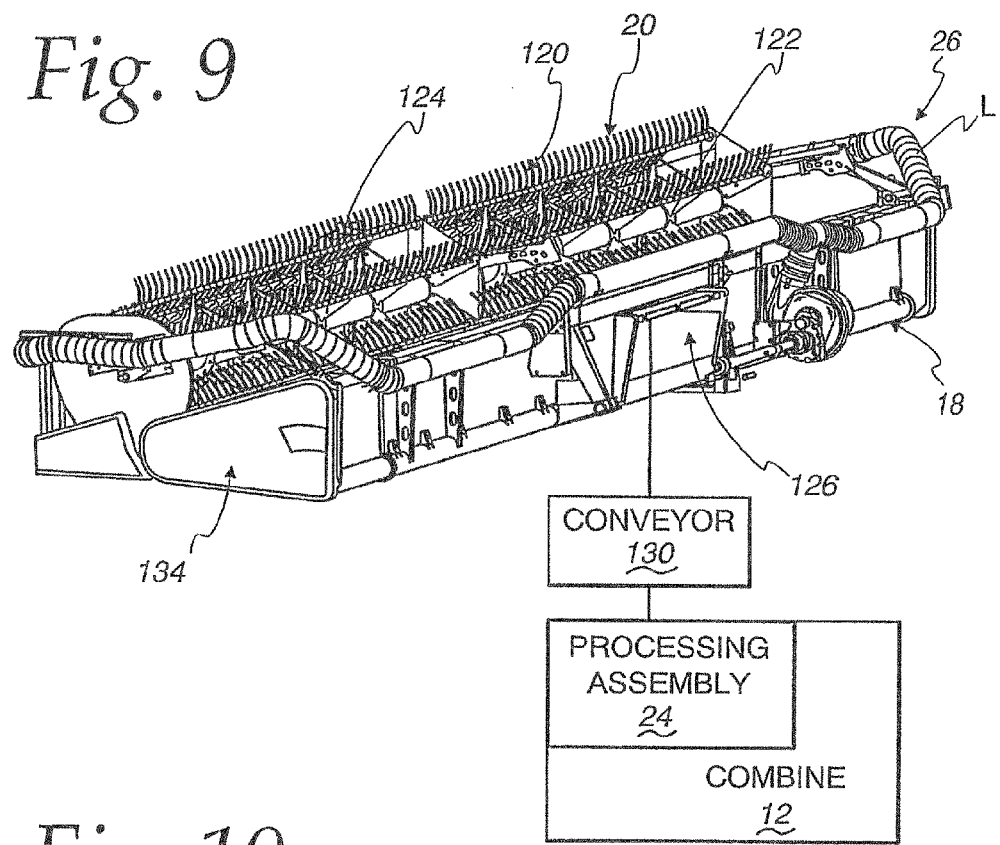
FIG. 9 is a perspective view of one specific, exemplary form of frame and associated harvesting assembly into which the inventive fluid delivery system is incorporated and together making up one exemplary form of harvesting apparatus.
Figure 10:
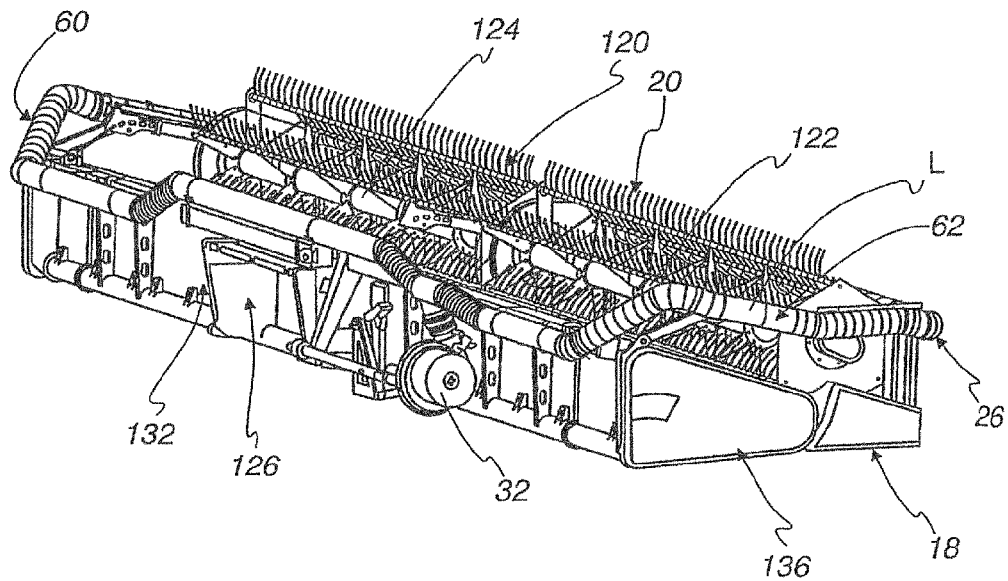
FIG. 10 is a view as in FIG. 9 from a different perspective.
Figure 11:
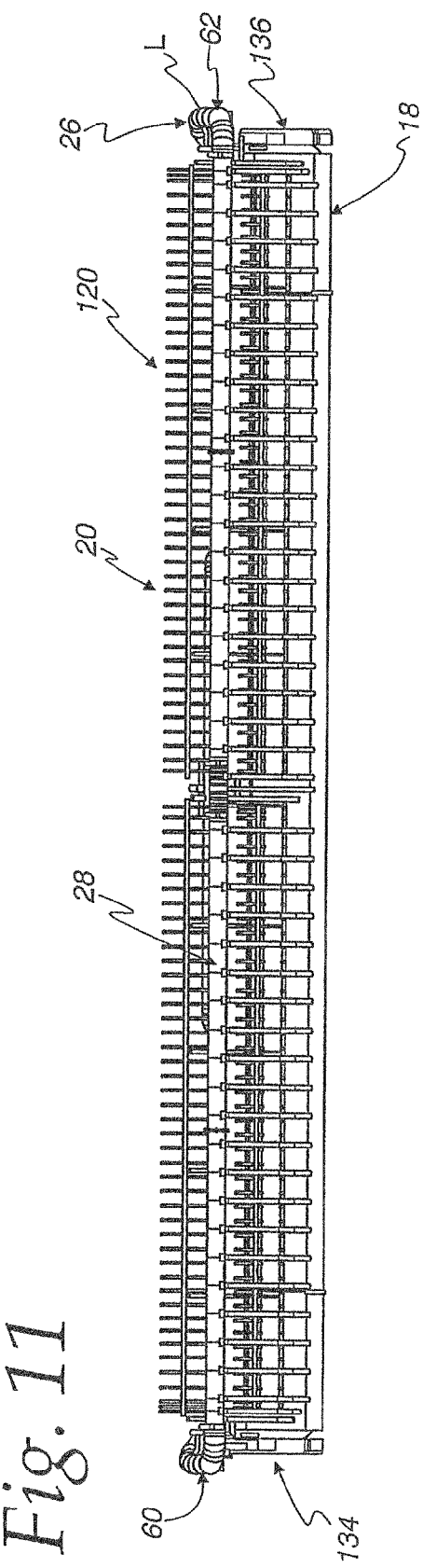
FIG. 11 is a front elevation view of the harvesting apparatus in FIGS. 9 and 10.

A baffle 98 is provided in the internal passageway 100 formed by the primary conduit length 28. The baffle 98, as shown schematically in FIGS. 3 and 3A, and seen in greater detail in FIG. 8, is generally required when the primary conduit length 28 has an overall dimension on the order of 25-45 feet. The baffle 98 provides a restriction and produces back pressure which maintains pressure in the fluid as it approaches the baffle 98 from opposite directions through the loop L, at which location the oppositely directed fluid flow blends. The flow past the baffle 98 has an increased velocity due to the areal reduction at the baffle 98, as a result of which there is pressure maintenance on both sides of the baffle 98. A shorter primary conduit length 28 may not require such a baffle 98.

The baffle 98 is in the form of a flat plate 102 with a segment of a circle 104 removed so that the baffle blocks approximately 50% of the cross-sectional area of the passageway 100. The baffle 98 is sandwiched between the flanges 80, 82 and bored so that the fasteners 83 extend therethrough and through the flanges 80, 82 for securement.

The schematic showing of the baffle 98 in FIG. 3 is intended to cover this specific construction and any other restricting structure, such as, but not limited to, a localized diameter reduction.

As noted in the Background section, above, in prior art constructions that use unidirectional flow, a baffle provides resistance that produces a pressure build-up thereat. The pressurized fluid moving past the baffle is caused to travel at a higher velocity, thereby increasing pressure. However, at the location of the baffle, there is typically a significant localized pressure loss that could compromise overall performance at the associated head.

On the other hand, the blended flow at the baffle 98, according to the present invention, does not have the same limitation, as the pressure up to the baffle 98 from both directions and at the baffle 98 has proven to be substantially constant.

While the precise location of the baffle 98 is not critical, it is preferably located at the location at 64 in the primary conduit length 28 closer to the end 40 than the end 42.

In FIGS. 9-13, one specific form of the frame 18 is shown with the fluid delivery system 26 incorporated.

In this embodiment, the frame 18 has a harvesting assembly 20 with a tined reel 120 made up of paired, laterally spaced reel sections 122, 124 that are turned around a laterally extending axis in conventional fashion through the combine 12. The reel 120 functions generally in the same manner as that described in U.S. Pat. No. 4,936,082, the disclosure of which is incorporated herein by reference.

The frame 18 defines a rectangular feed housing 126 through which accumulated crop is directed to the aforementioned processing assembly 24 in the combine 12.

Figure 12:
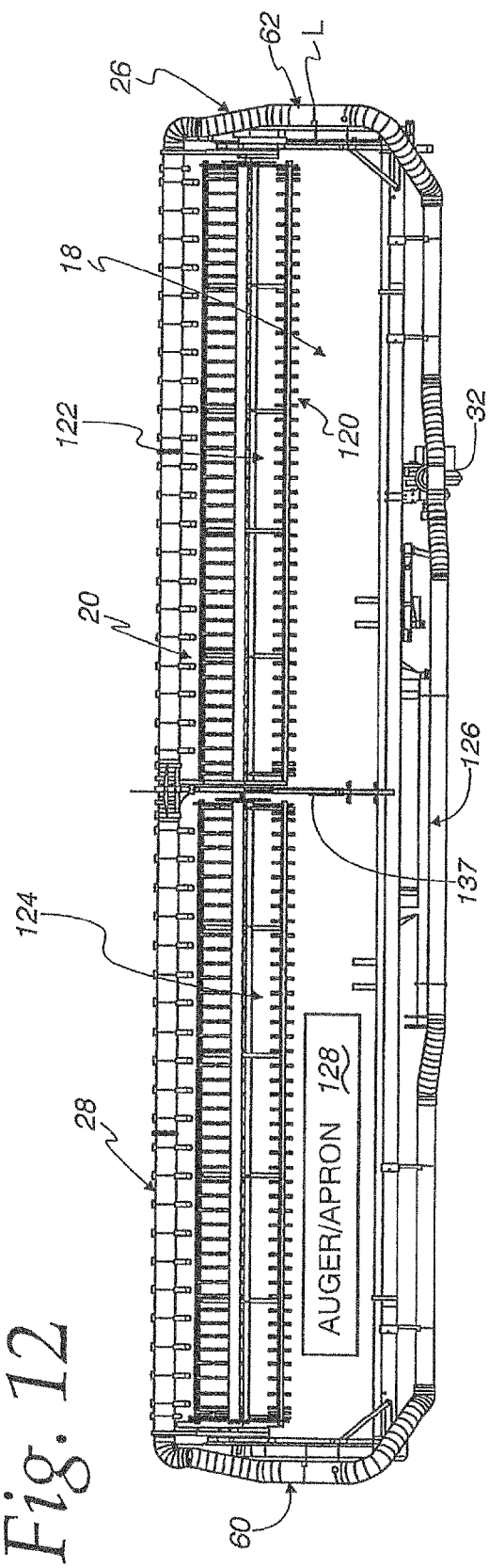
FIG. 12 is a plan view of the harvesting apparatus in FIGS. 9-11.
Figure 13:
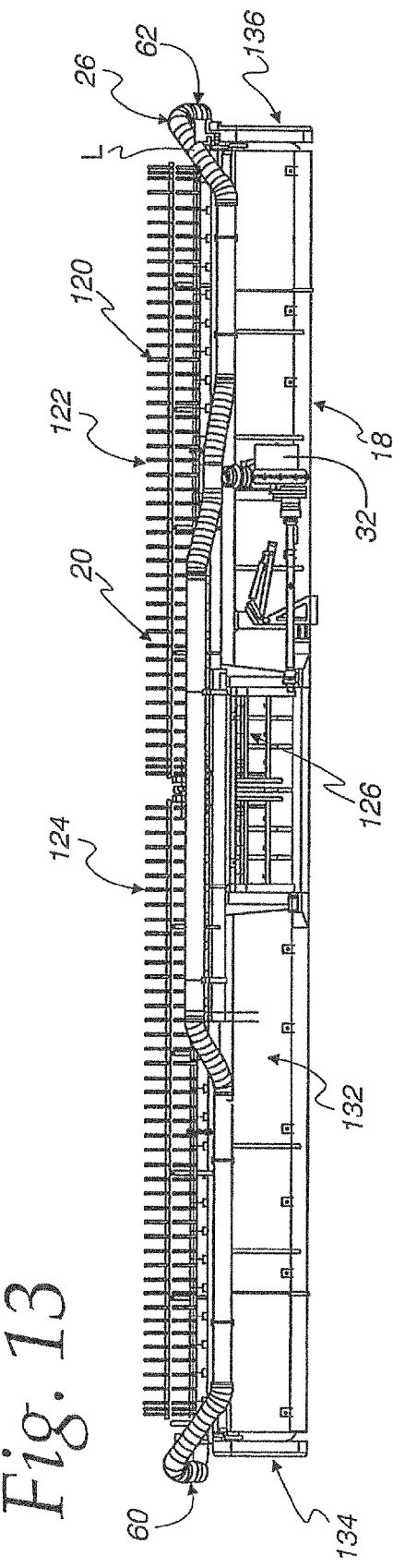
FIG. 13 is a rear elevation view of the harvesting apparatus in FIGS. 9-12.

As shown schematically in FIG. 12, an auger or apron arrangement 128 is utilized to cross feed severed crop to the vicinity of the feed housing 126, where it is intercepted by a conveyor 130 that advances the severed crop to the processing assembly 24 thereon.

The frame 18 has a rear wall 132 in which the feed housing 126 is formed, and spaced side walls 134, 136. The loop L is fixed principally to the rear and side walls 132, 134, 136 in the relationship shown. The primary conduit length 28 has a rigidifying, mid-length support 137. With the fluid delivery system 26 operatively connected to the frame 18 and pressurized fluid source 32, the rear wall portion conforms nominally to the feed housing 126 by having a localized, inverted "U" shape that wraps therearound. The legs 60, 62 bend conformingly to the contours of the side walls 134, 136, including at their juncture with the rear wall 132.

By using multiple components in the different configurations to define the loop L, the fore-and-aft and vertical location of the primary conduit length 28 can be changed, not only to accommodate different frame configurations, but also to accommodate potential fore-and-aft adjusting movement of the reel 120. This adjusting capability is commonly incorporated into existing harvesting assemblies.

Figure 14:
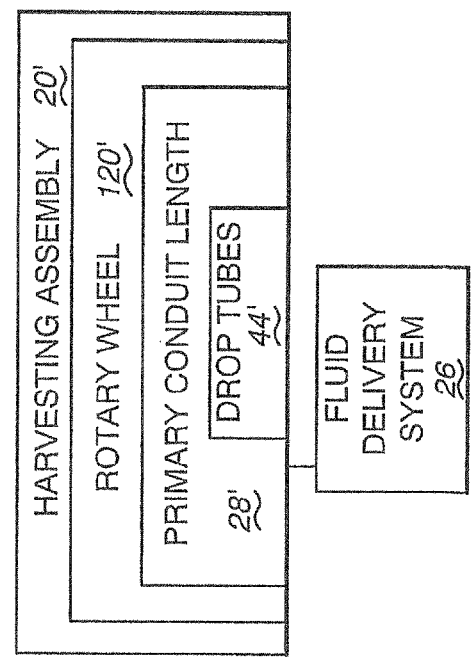
FIG. 14 is a schematic representation of another form of fluid delivery system, according to the present invention.

As noted earlier, the harvesting assembly may utilize the fixed primary conduit length 28 or may direct air through a primary conduit length 28' integrated into a rotary reel 120' as shown in FIG. 14 on a modified form of harvesting assembly 20'. The rotary reel 120' is supplied by the fluid delivery system 26 and causes pressurized air to discharge through outlets on tubes 44' that are fed through the primary conduit length 28' and rotate with the reel 120'.

Figure 15:
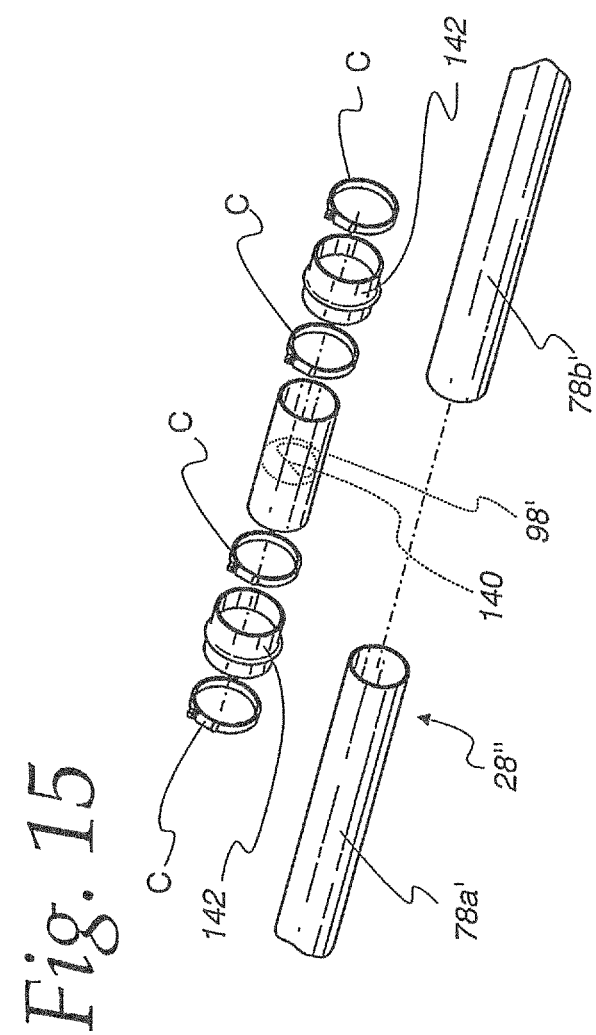
FIG. 15 is an exploded, perspective view, corresponding to that in FIG. 8, and showing an alternative form of baffle integrated into a primary conduit length.

In another variation, as shown in FIG. 15, parts 78a', 78b' telescopingly engage to form at least a part of a primary conduit length 28". This construction is an alternative to the use of the aforementioned flanges 80, 82. The conduit length 28" may be fit with a baffle 98' that is integrated into a sleeve 140. The sleeve 140 can be offered as a preformed unit that is integrated into the parts 78a', 78b' using like rubber connectors which are telescopingly engaged with the sleeve 140 and the parts 78a', 78b' and secured by restrictable clamps C.

Figure 16:
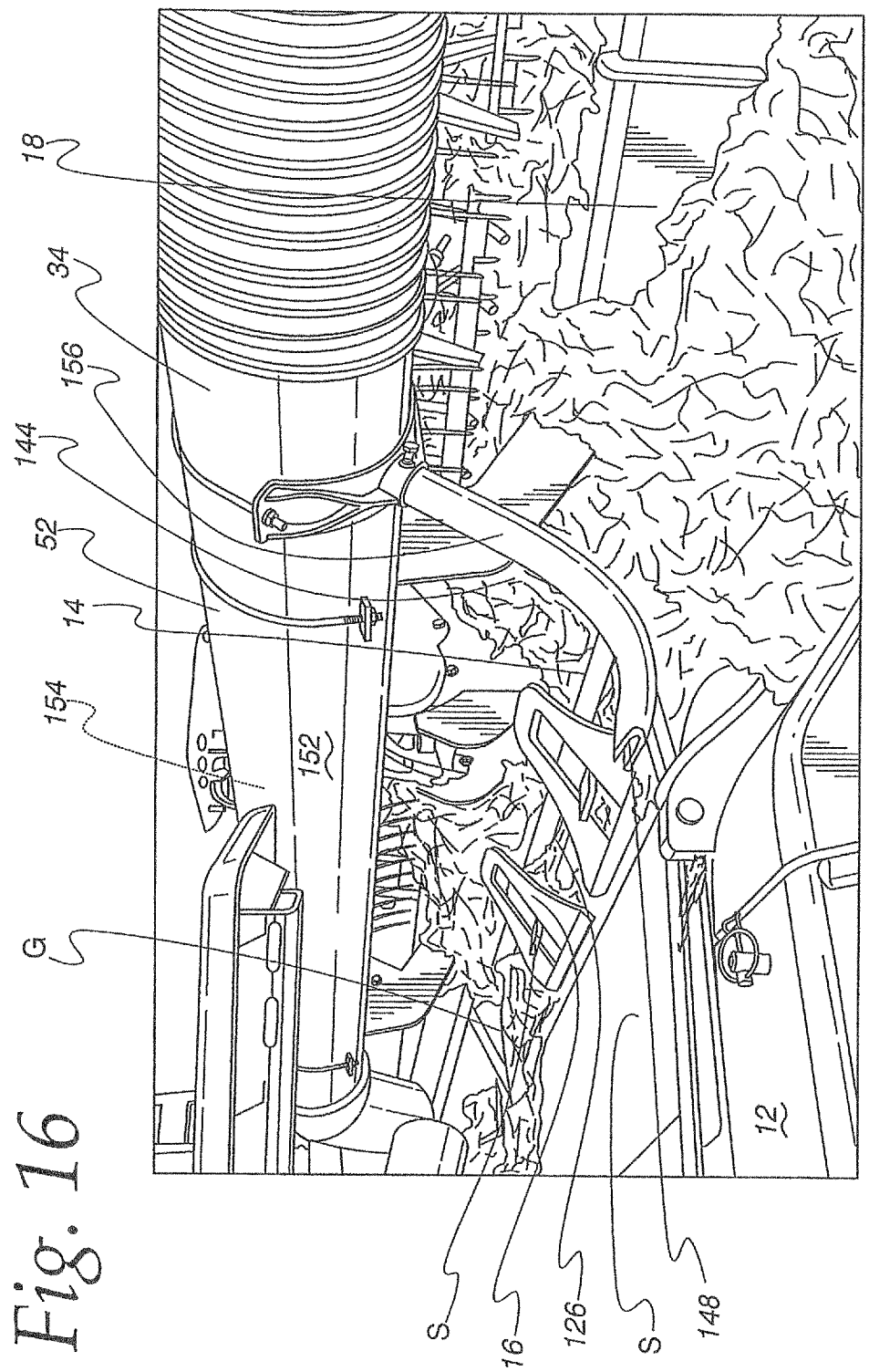
FIG. 16 is a fragmentary, perspective view of the front of the combine, shown schematically in FIGS. 1 and 3, with the frame/head having the inventive fluid delivery system incorporated therein and with a cleaning conduit assembly incorporated to avoid accumulation of crop/debris near a feed housing where the combine and frame are connected.
Figure 17:
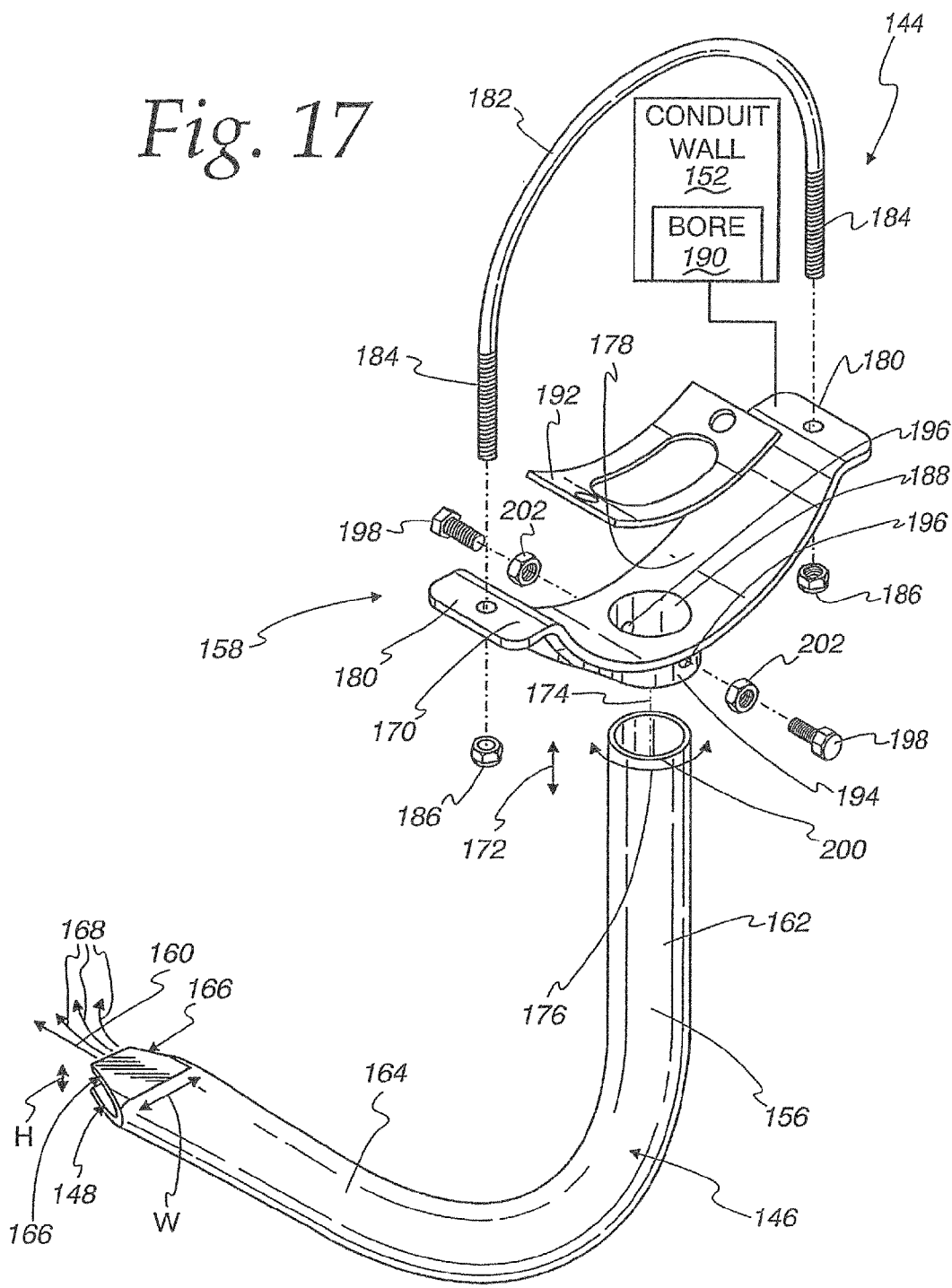
FIG. 17 is an enlarged, exploded, perspective view of the cleaning conduit assembly in FIG. 16.
Figure 18:
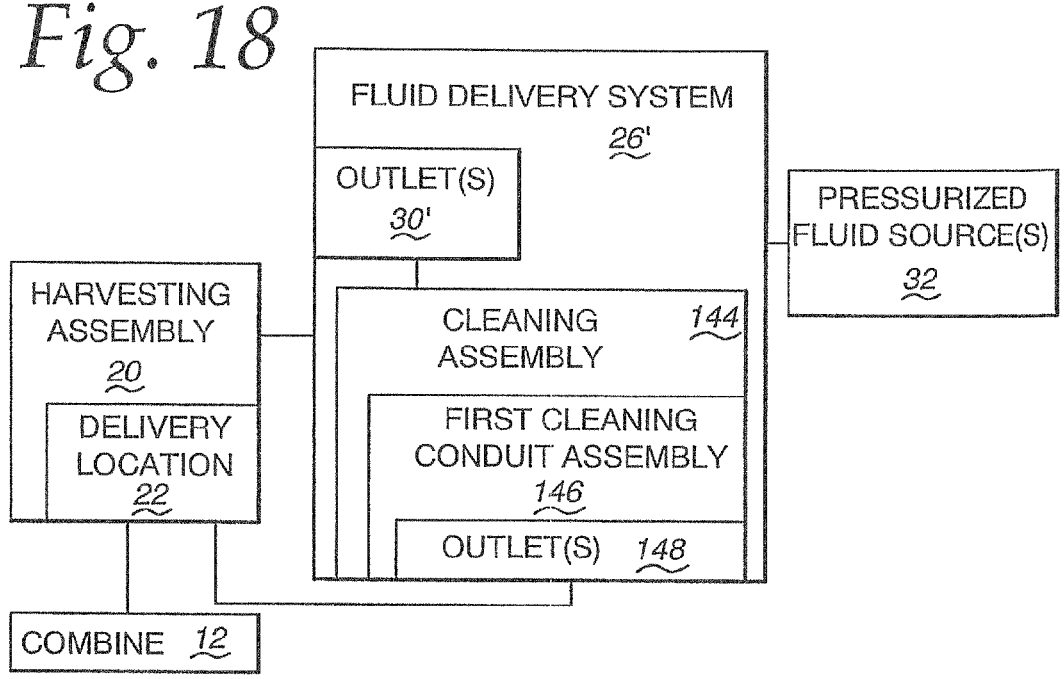
FIG. 18 is a schematic representation of the inventive fluid delivery system including the cleaning conduit assembly.

Another system variation is shown in FIGS. 16-19 and is incorporated into the fluid delivery system 26 as described above, or a fluid delivery system 26', shown schematically in FIG. 18, to address the potential accumulation of crop and debris at the feed housing 126. The fluid delivery system 26' shown in FIG. 18 is intended to encompass the system 26 as described above, and virtually any type of system that delivers pressurized fluid from one or more sources 32 to one or more outlets 30', corresponding to the outlets 30. The pressurized fluid is discharged to at least one of: a) facilitate severance of crop; and b) facilitate advancement of severed crop rearwardly in relationship to the frame 18 to a location for further processing.

The harvesting assembly 20, with which the fluid delivery system 26' is utilized, has the same general construction as described above, including a delivery location at 22 whereat the feed housing 126 is formed and through which crop is directed to the combine 12. The precise details of the fluid delivery system 26' are not critical to the operation of this particular feature. All that is required is that pressurized fluid from the source 32, or multiple sources 32, be directed to one or more outlets 30', either in a continuous loop or without the loop construction in a single direction.

As shown schematically in FIG. 18, the fluid delivery system 26' includes a cleaning assembly 144 that has a first cleaning conduit assembly 146 for directing pressurized fluid from the source(s) 32 in at least a first stream that repositions crop that has been positioned to be out of the continuous flow of crop to the combine, and other "debris" in the vicinity of the delivery location 22 to reduce debris build-up in the vicinity of the feed housing 126. The stream can be discharged at one or more outlets 148 on the first cleaning conduit assembly 146. Accordingly, the pressurized fluid source(s) 32 supplies both the outlet(s) 30' and outlet(s) 148.

The first cleaning conduit assembly 146 is configured so that the first stream of pressurized fluid from the first cleaning conduit assembly 146 has a laterally extending directional component.

Figure 19:
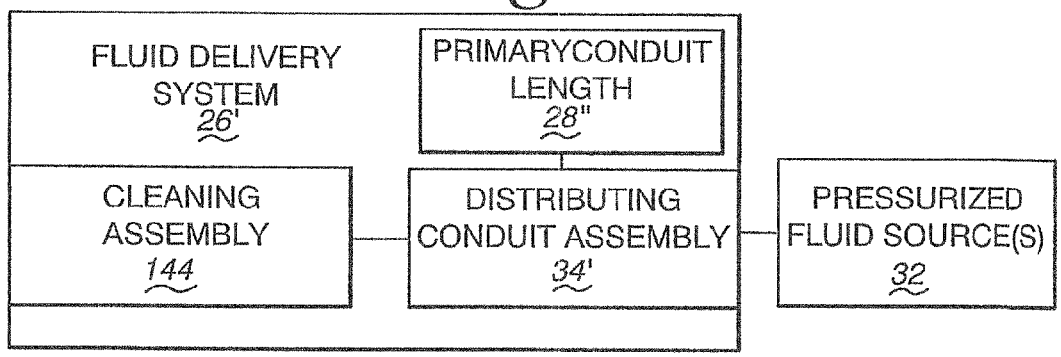
FIG. 19 is a further schematic representation of the fluid delivery system as shown in FIG. 18.

As shown in FIG. 19, the fluid delivery system 26' may be made up of a primary conduit length 28" that is fed pressurized fluid from the source(s) 32 through a distributing conduit assembly 34', with the same construction as described above for the distributing conduit assembly 34, or a different construction. The primary conduit length 28" may correspond in construction to the primary conduit length 28, 28', described above, or may have a different construction.

As depicted in FIG. 19, the cleaning assembly 144 is configured to communicate pressurized fluid directly from the distributing conduit assembly 34' to generate the first stream of pressurized fluid. However, within the generic showing of FIG. 18, it is contemplated that the first cleaning assembly may be connected to any component or location on the fluid delivery system 26' that is supplied by the pressurized fluid source(s) 32.

As shown in FIG. 16, one specific form of the cleaning assembly 144 is integrated into a conduit portion 150 that is part of the rear conduit portion made up of the conduit portions/lengths 52, 54, with the conduit portion/length 52 shown in FIG. 16. The conduit portion 150 has a wall 152 extending around a passageway 154 through which pressurized fluid from the at least one pressurized fluid source 32 is directed.

Figure 20:
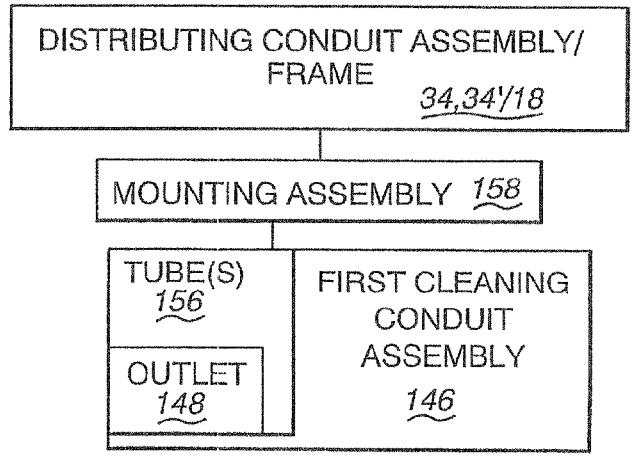
FIG. 20 is a schematic representation of a mounting assembly for the cleaning conduit assembly as shown in FIGS. 16-19.

As shown in FIG. 20, the first cleaning conduit assembly 146 on the cleaning assembly 144 includes at least one tube 156 defining the outlet 148. The tube 156 is attached either to the distributing conduit assembly 34, 34' or the frame 18 through a mounting assembly 158. The tube 156 and mounting assembly 158 are shown schematically to encompass the specific forms thereof, described below, and many other variations thereof that might be devised by one skilled in the art to perform the same function, without departing from the invention.

As shown in FIGS. 16 and 17, the tube 156 is attached to the conduit portion 150 on the distributing conduit assembly 34. With the tube 156 operatively attached, the tube 156 communicates pressurized fluid from within the passageway 154 to the outlet 148 from which a stream of pressurized fluid is directed principally in the direction of the arrow 160, that is a lateral direction.

The tube 156 has a bent shape with a depending length 162 and a straight length 164 that extends substantially horizontally up to the outlet 148. The outlet may have a circular configuration but preferably, as shown, has a non-circular cross-sectional configuration with a width dimension W in a horizontal direction that is longer than a height dimension H in a vertical direction. The end region is cut away at the widthwise extremities to define U-shaped openings 166 that allow spreading out of the fluid stream in the direction of the arrows 168. This produces a fan-shaped pattern/curtain that is nominally flat and horizontally oriented. The fan-shaped pattern also has a significant vertical spread by reason of the height H of the outlet 148.

The mounting assembly 158 is configured to operatively mount the tube 156 so that the tube 156 can be placed selectively in different relationships to the conduit portion 150. More specifically, the tube length 162 is movable vertically relative to a mounting bracket 170, as indicated by the double-headed arrow 172. Additionally, the tube 156 can be turned relative to the bracket 170 about a vertically extending axis 174, as indicated by the double-headed arrow 176. Accordingly, the height of the discharging airstream and the specific lateral direction thereof can be changed selectively by an operator.

The bracket 170 has a curved body 178 that wraps in a nominally conforming manner about the periphery of the conduit portion 150. The body 178 has oppositely outturned flanges 180 which are bored to accommodate separate legs of a U-shaped strap 182. The strap ends 184 can be directed through the flanges 180 and are threaded to engage separate nuts 186. With the strap ends 184 extending through the flanges 180, the strap 182 and bracket 170 cooperatively extend fully around the conduit portion 150. By tightening the nuts 186, the bracket 170 can be fixedly secured to the conduit portion 150.

The bracket 170 is situated on the conduit wall 152 so that a bore 188 therethrough aligns with a bore 190 through the conduit wall 152. A gasket 192 is sandwiched between the bracket 170 and conduit wall 152 to avoid leakage and resulting pressure loss.

The bore 190 is defined principally by an annular sleeve 194 with diametrically opposite threaded bores 196 therethrough. The bores 196 each accepts a fastener 198.

The free end 200 of the depending length 162 on the tube 156 can be slid upwardly into the bore 188 an amount so as to situate the horizontal, straight leg 164 at a desired height. The tube 156 can be turned around the axis 174 to control the precise lateral direction of the discharging fluid stream. Once the desired height and angular orientation are selected, the fasteners 198 can be tightened so as to thereby be forcibly advanced against diametrically opposite locations on the tube 156 to secure its position. Nuts 202 on the fasteners 198 can be tightened against the sleeve 194 to avoid inadvertent loosening of the tightened fasteners 198.

The connectors 14, 16 cooperating between the frame 18 and combine 12 are generally identified in FIG. 16. These connectors 14, 16, regardless of their precise configuration, define a number of surfaces S facing generally upwardly that are prone to supporting rearwardly migrating crop material. For purposes of simplicity, the upwardly facing surfaces S will be characterized as defined by the connectors 14, 16 when, in fact, additionally the surfaces S are defined by the forward region of the combine 12 and the rear region of the frame 18. It is at this region that the tube outlet 148 is located so that the fanned pattern of the discharging stream flows across the upwardly facing surfaces S to effect clearance of debris therefrom. The crop/debris is caused to move laterally into a gap region at G through which it is allowed to drop back into the field. The outlet 148 is closer to one side of the frame 12 so that a single outlet 148 may effectively move the crop/debris off of the surfaces S. Of course, multiple, strategically placed outlets 148 may be incorporated to control crop/debris movement in a most effective manner.

The foregoing disclosure of specific embodiments is intended to be illustrative of the broad concepts comprehended by the invention.

The invention claimed is:

1. A harvesting apparatus comprising:
a frame configured to be advanced over an area in which a crop is grown,
the frame having laterally spaced sides, a front, and a rear;
a harvesting assembly on the frame configured to process severed crop over a width between the spaced sides of the frame as the frame is advanced; and
a fluid delivery system through which pressurized fluid is discharged in discrete streams each with a component that is directed to at least one of: a) facilitate severance of crop; and b) facilitate advancement of severed crop rearwardly in relationship to the frame to a location for further processing,
the fluid delivery system comprising: i) a primary conduit length extending in a lateral direction between the sides of the frame; ii) a plurality of laterally spaced outlets from which fluid from the primary conduit length is discharged; iii) a pressurized fluid source; and iv) a distributing conduit assembly that directs pressurized fluid from the pressurized fluid source to laterally spaced locations from where pressurized fluid is directed in laterally opposite directions into the primary conduit length and to the laterally spaced outlets.

2. The harvesting apparatus according to claim 1 wherein the fluid delivery system is configured so that the pressurized fluid directed in laterally opposite directions into the primary conduit length is caused to blend at a first location.

3. The harvesting apparatus according to claim 2 wherein the first location is closer to one of the spaced frame sides than the other spaced frame side.

4. The harvesting apparatus according to claim 3 wherein the pressurized fluid supply is configured to deliver pressurized fluid into the distributing conduit assembly at a second location that is closer to the other of the spaced sides than the one of the spaced sides.

5. The harvesting apparatus according to claim 1 wherein the primary conduit length and distributing conduit assembly define a continuous loop into which pressurized fluid from the pressurized fluid source is delivered to flow in opposite directions.

6. The harvesting apparatus according to claim 5 wherein the continuous loop is defined by a laterally extending rear conduit portion and first and second laterally spaced legs each extending in a fore-and-aft direction between the primary conduit length and the rear conduit portion.

7. The harvesting apparatus according to claim 1 wherein the fluid delivery system is configured to direct pressurized air through one of: a) a rotary reel; and b) a fixed conduit length.

8. The harvesting apparatus according to claim 1 wherein the distributing conduit assembly comprises a conduit with an inside diameter on the order of eight inches.

9. The harvesting apparatus according to claim 1 wherein the pressurized fluid source is attached to the frame to move as one piece with the frame.

10. The harvesting apparatus according to claim 9 wherein the pressurized fluid source comprises a rotary fan assembly and a gearbox with an input shaft that is driven to operate the rotary fan assembly.

11. The harvesting apparatus according to claim 1 wherein the distributing conduit assembly comprises first and second conduit portions that are connected to the pressurized fluid source so that pressurized fluid generated by the pressurized fluid supply source is directed in opposite directions through the first and second conduit portions away from the fluid supply source.

12. The harvesting apparatus according to claim 5 wherein the continuous loop is defined by first and second oppositely opening U-shaped sections.

13. The harvesting apparatus according to claim 1 wherein the fluid delivery system comprises a plurality of drop tubes that are each connected to the primary conduit length to direct pressurized fluid in the primary conduit length in a stream that has a rear directional component.

14. The harvesting apparatus according to claim 11 wherein the fluid delivery system comprises one of a "Y"- and "T"-shaped connector that directs pressurized fluid from the pressurized fluid supply source into each of the first and second conduit portions.

15. The harvesting apparatus according to claim 1 wherein the distributing conduit assembly comprises a plurality of: a) reconfigurable conduit lengths; and b) substantially rigid conduit lengths that are joined together.

16. The harvesting apparatus according to claim 1 wherein the harvesting assembly is configured to at least one of: a) sever crop; and b) process pre-severed crop.

17. The harvesting apparatus according to claim 16 wherein the harvesting assembly is configured to advance severed crop laterally to a delivery location approximately mid-way between the laterally spaced sides of the frame.

18. The harvesting apparatus according to claim 1 wherein the harvesting assembly comprises a reel that rotates around a laterally extending axis relative to the frame and is configured to advance crop rearwardly relative to the frame.

19. A fluid delivery system as recited in claim 1.

20. The fluid delivery system according to claim 19 wherein the fluid delivery system is configured so that the pressurized fluid directed in laterally opposite directions into the primary conduit length is caused to blend at a first location.

* * * * *